United States Patent [19]

Shroy, Jr. et al.

[11] Patent Number: 4,910,592
[45] Date of Patent: Mar. 20, 1990

[54] RADIATION IMAGING AUTOMATIC GAIN CONTROL

[75] Inventors: Robert E. Shroy, Jr., Willoughby; Leonard F. Plut, Willowick; David Nicolay, Fairview Park; Louis A. Paradiso, Cleveland; Charles G. Cassudakis, Mentor, all of Ohio

[73] Assignee: Picker International, Inc., Cleveland, Ohio

[21] Appl. No.: 143,629

[22] Filed: Jan. 13, 1988

[51] Int. Cl.[4] .............................................. H04N 5/32
[52] U.S. Cl. ..................................... 358/111; 378/99; 358/174
[58] Field of Search .................. 378/99; 358/111, 168, 358/174

[56] References Cited

U.S. PATENT DOCUMENTS

| | | | |
|---|---|---|---|
| 3,257,506 | 6/1966 | Siepmann | 378/99 |
| 3,849,650 | 11/1974 | Patten | 378/99 |
| 3,996,420 | 12/1976 | Geluk | 378/99 |
| 4,013,833 | 3/1977 | Zimmerman | 358/111 |
| 4,101,776 | 7/1978 | Mansfield et al. | 378/99 |
| 4,204,225 | 5/1980 | Mistretta | 378/99 |
| 4,204,226 | 5/1980 | Mistretta et al. | 378/99 |

FOREIGN PATENT DOCUMENTS

| | | | |
|---|---|---|---|
| 0113299 | 9/1980 | Japan | 378/99 |
| 0080066 | 5/1984 | Japan | 358/111 |

Primary Examiner—Janice A. Howell
Assistant Examiner—John C. Freeman
Attorney, Agent, or Firm—Watts, Hoffmann, Fisher & Heinke Co.

[57] ABSTRACT

An x-ray imaging system incorporating a television imaging chain is disclosed. The system includes automatic gain control circuitry, operable upon the video signal produced by the camera of the television imaging chain. The gain control circuitry affords automatic gain control capability for increasing the video gain in response to an undesired decrease in video output signal level. The gain control circuitry, however, is constrained in that it includes circuitry for establishing a minimum video gain which is always maintained during a study, irrespective of increases in brightness of an overall sample window area of the image, which could otherwise cause undesirable darkening of areas of interest in the image when the sample window also includes uninteresting structure which happens to exhibit a bright field.

18 Claims, 3 Drawing Sheets

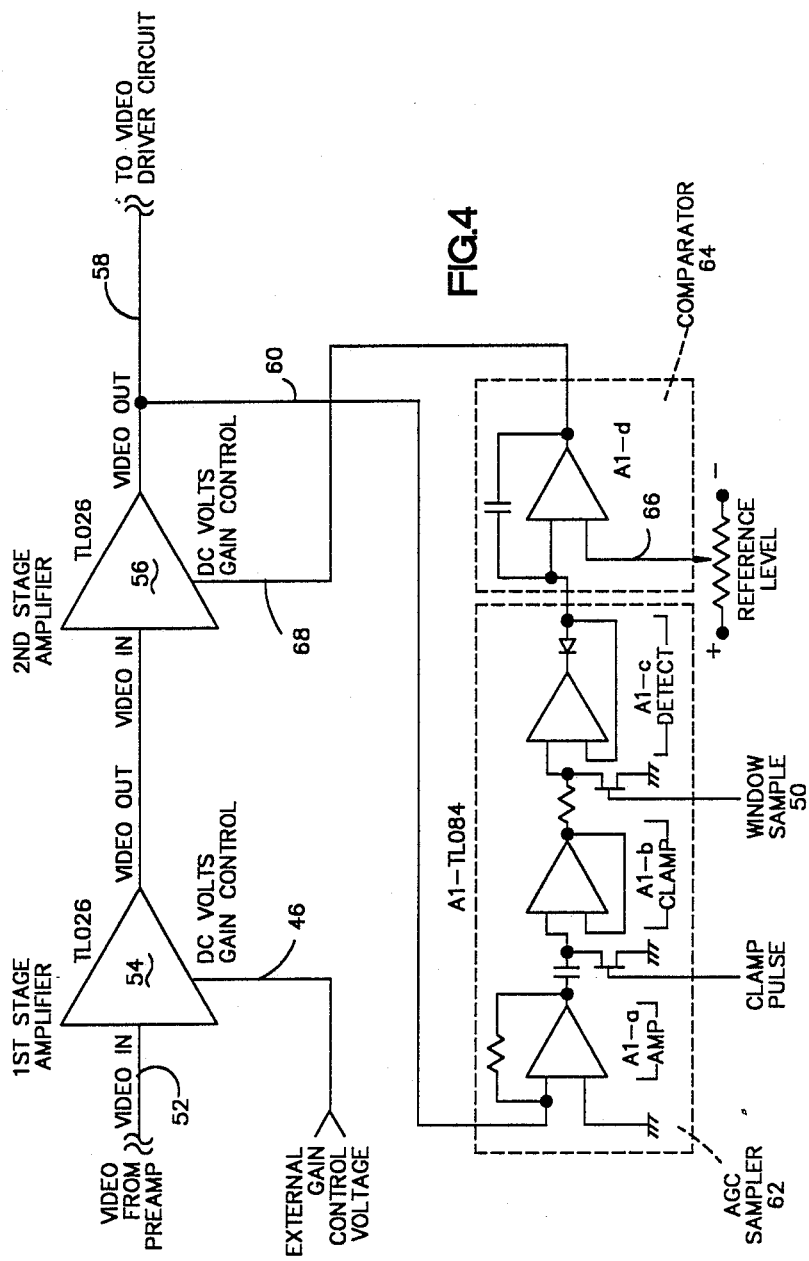

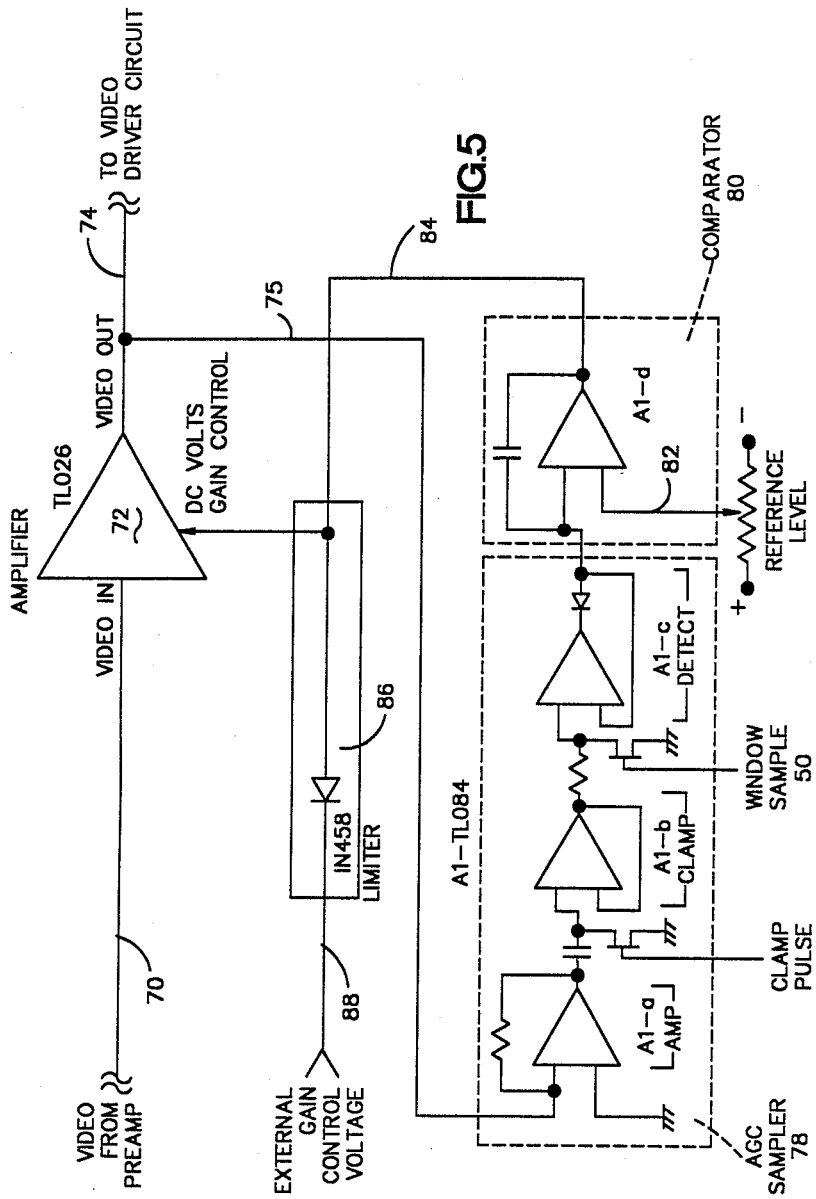

RADIATION IMAGING AUTOMATIC GAIN CONTROL

TECHNICAL FIELD

This invention relates generally to the field of medical diagnostic imaging systems employing x-rays and a television imaging chain. The invention relates more specifically to circuitry and method for improving automatic gain control for television camera apparatus included in such systems.

BACKGROUND ART

Medical diagnostic imaging systems employing x-ray and television commonly consist of several major elements An x-ray source propagates x-rays along a beam path. An image intensifier tube is spaced from the source a sufficient distance to allow a patient to be interposed between the source and an input face of the image intensifier tube. The image intensifier tube responds to patterns of x-rays emergent from the patient and incident on its input face to produce at an output face a relatively small and bright visible light image corresponding to the pattern of x-rays emergent from the patient and incident on the input face.

An optical apparatus, sometimes called an "optical cube" is positioned to receive the light from the image appearing at tube output face. The optical cube often includes a lensing system and/or a beam splitter to apportion or selectively direct the light among different optical ports for imaging in one or more of a variety of modalities.

Two such modalities include a cine camera and a television camera. When employed, each of the cine camera and television camera is positioned to view a different optical output port of the optical cube. The cine camera is a device which records moving images on film, analogous to a movie camera.

The television camera is of a known type, and employs a television camera pickup tube. The television camera pickup tube includes a target on which light from the image transmitted from the optical cube falls, and an electron gun to generate an electron beam. Circuitry and apparatus provide for causing the electron beam to scan the target in raster fashion. The television camera, through variations in the electron beam current, produces an electrical video signal which describes the brightness distribution of the image incident upon the target.

The television camera also includes other circuitry for producing appropriate horizontal and vertical television synchronization signals, which, with the video, define the image electronically.

The television camera is also provided with circuitry for automatically adjusting the television camera video signal gain.

The video and synchronization signals, together making up a television signal ensemble, are transmitted to a television monitor which converts the television ensemble to a second, larger visible light image corresponding to the light image produced at the output face of the image intensifire tube. The image produced by the monitor is intended to be of sufficient size, resolution and general quality to serve as a medical diagnostic tool.

The image on the television monitor, in the fluoroscopic system thus far described, is a real time image corresponding o that appearing at the output face of the image intensifier tube. Additionally, the monitor image is useful as a "cine verification", which is the presentation of a television monitor image corresponding to an image being recorded on cine film, to enable an operator to evaluate in real time the quality of the image being recorded on the film for later use.

Imaging systems such as those described here are sometimes equipped with a "brightness stabilization" feature. In brightness stabilization, a light sensor, often a photomultiplier tube, is positioned to view the image of the output face of the image intensifier tube. The photomultiplier tube generates an electrical signal which represents the overall brightness of the image tube output. This signal is coupled to circuitry controlling the x-ray source to adjust the source to maintain optimal brightness of the image at the image tube output. When a photomultiplier tube senses a decrease in brightness at the output face, the source is adjusted to increase its x-ray output and hence increase the brightness of the output image. When an increase is sensed, the x-ray tube is adjusted to reduce x-ray output.

Brightness stabilization has limits in its effectiveness, due to the fact that, irrespective of image brightness, x-ray dose to the patient must be limited to a predetermined maximum. Thus, brightness stabilization is not always able to compensate entirely for a decrease in image brightness.

In operating modes such as described above, it is also desirable to control the gain of the television camera such that the video input signal level, which represents the brightness of the image viewed by the television camera, meets the particular input requirements of the television monitor to optimize monitor picture quality.

There are two methods of controlling television camera gain: fixed gain and automatic gain control, (mentioned above) the latter of which is sometimes known as "AGC".

In fixed gain operation the television camera is preset to have a uniform gain for a given operating mode. Differing fixed gains, however, are sometimes used in accordance with which of a plurality of different operating modes is selected.

Often, fixed gain operation is satisfactory, because the x-ray system, including the x-ray source, is usually operated, during a single study, to provide a relatively constant detected x-ray intensity, which usually yields a relatively constant light intensity of the image appearing at the image tube output face.

Brightness stabilization, as described above, assists in maintaining uniform image tube image brightness.

When the detected x-ray output from the source remains relatively constant, so does the brightness of the light image appearing at the image tube output face. In such circumstances, fixed gain control can yield adequate operation. There are times, however, when the constant light level at the image tube output cannot be maintained.

The major disadvantage of fixed gain operation is that it requires a constant input brightness level from the visible light image at the image tube output.

The brightness delivered to the television camera is approximately proportional to the x-ray intensity emergent from the patient. Thus, a constant brightness corresponds to constant x-ray level from the patient. Government regulations, however, limit the amount of radiation which may be input to a patient's body. With radiation dose being limited, it is not always possible to achieve the desired level of x-rays emergent from the patient to obtain the desired uniform brightness at the image tube output face if there are large amounts of tissue to be traversed by the x-rays. Such large amounts of tissue are regularly encountered when imaging heavy patients, or with radiological views requiring the passage of x-rays through the patient's body at an oblique angle. In such cases, brightness at the image tube output face is often reduced to the point at which the brightness delivered to the television, and consequently the monitor image, is insufficient, and this lack of brightness cannot be overcome by the administration of a higher x-ray dose.

Automatic gain control (AGC) circuitry and technique have sometimes been applied to the television camera to add facility in controlling the level of the television video output to the monitor. In practice of AGC, the television gain is adjusted automatically so that the output to the monitor remains at a specified level notwithstanding brightness changes in the image appearing at the intensifier tube output face. To do this, circuitry is employed which samples the video signal output voltage corresponding to a specified sample window of the intensifier output tube image. Often, the sampled region constitutes a circular central portion of the output image.

The AGC circuitry can be one, or a combination of two kinds. One type represents the average output level within the sampled window. Another type represents the peak brightness level sensed within the sampled window.

The AGC circuitry includes feedback control circuitry operable on the television camera for adjusting the gain of the television camera if the video voltage deviates from a predetermined optimum reference level. If the video signal rises above the optimum level, the AGC circuitry reduces the video gain of the television camera. If the video signal output voltage falls below the predetermined optimum level, the AGC circuitry increases the video gain of the television camera.

While obviating some of the problems associated with fixed gain, AGC circuitry has its own shortcomings. Through its feedback circuitry, the automatic gain control circuitry is intended to assure that the output voltage, and hence the monitor brightness, remains at the desired level at all times.

A problem with automatic gain control circuitry operation relates to properly specifying the sample window of the intensifier tube output image so that it includes the anatomy of interest and avoids anatomy that is of no particular interest in the study being conducted. This problem is most acute in cardiac cineangiography, where the television system produces a relatively dark image of the heart (the anatomy of interest) directly beside a relatively bright lung image field (in which there is no interest).

There are views in cineangiography where it is virtually impossible to keep the sample area from including significant amounts of the bright adjacent lung field. When the AGC circuitry senses light from the bright lung field, it responds by adjusting downwardly the television camera video gain and making an even darker heart image. In such an image, the heart may not be displayed with enough brightness to be seen, even though the overall sampled area window may have the desired brightness.

There are numerous other examples where the automatic gain control sample window will contain anatomy that is not of interest, but which registers a brightness value which impairs the operation of the automatic gain control circuitry in the manner described above.

It is therefore a general object of this invention to provide an x-ray imaging system which enjoys the advantages of both fixed video gain and automatic video gain control, while reducing or eliminating the disadvantages of both.

DISCLOSURE OF INVENTION

The disadvantages of the prior art are reduced or eliminated by the use of an x-ray imaging system and method having improved video gain control for optimizing television monitor operation.

A system embodying this invention includes an x-ray source for directing x-rays toward the input face of an image intensifier tube. The image tube produces a first visible image at an output face corresponding to the pattern of received x-rays. A television imaging chain is used including a television camera and monitor, the camera being positioned to view the visible image at the image tube output.

Special gain control circuitry is applied to the video signal which the camera produces, prior to the transmission of the video to the monitor. In one embodiment a single variable amplifier is used. Video from the camera is presented as an input to the monitor, which amplifies the video with a gain which is a function of both an external control signal and a feedback signal which involves the comparison of the actual video output from the amplifier with a predetermined reference.

The output video is coupled to control the gain of the variable amplifier in accordance with a closed loop feedback mode. If the output video falls below the reference level, the AGC circuitry increases amplifier gain, and if the output video rises above the reference level, the AGC circuit in turn decreases amplifier gain.

The external control signal is also coupled to the variable amplifier, and establishes a minimum gain for the variable amplifier, such that the feedback AGC circuitry cannot drive the gain of the variable amplifier below this preordained minimum.

In accordance with another embodiment, a two-stage amplification system is used. A first amplifier stage is controlled by an external control signal to have a fixed or constant gain of between 1.0 and about 5.0. A second variable amplifier is coupled in series with the first stage amplifier and is controlled in a feedback fashion by automatic gain control circuitry. The automatic gain control circuitry operates like that of the previous embodiment, wherein the output video from the second stage amplifier is compared with the reference, and the gain is increased if the actual video level drops below the reference level.

An important feature is that the second stage amplifier is of a type which has circuitry defining a gain which cannot be reduced below a predetermined minimum level. In a specific embodiment, that level constitutes unity.

These embodiments make use of the most beneficial features of both fixed gain control and automatic gain control, without the disadvantages of either. Automatic gain control is used to lend flexibility to the previously known fixed gain circuitry. The AGC assists in maintaining an optimum video output even when the output face image darkens, without the need for increasing x-ray intensity and dose to the patient. The fixed gain control, on the other hand, complements the AGC circuitry by establishing a minimum total gain for the video, which cannot be driven below that level by the AGC circuitry. This feature renders the imaging system impervious to undesired operation of the AGC circuitry, which, without this minimum gain establishment, would sometimes reduce gain and darken an image undesirably when the sampled window contains portions which are bright, yet are of no interest.

Other aspects of the present invention will be understood in more detail by reference to the following detailed description, and to the drawings.

DESCRIPTION OF THE DRAWINGS

FIGS. 4 and 5 are partially schematic drawings illustrating in detail the components shown in block form in FIGS. 2 and 3.

BEST MODE FOR CARRYING OUT INVENTION

Figure 1:
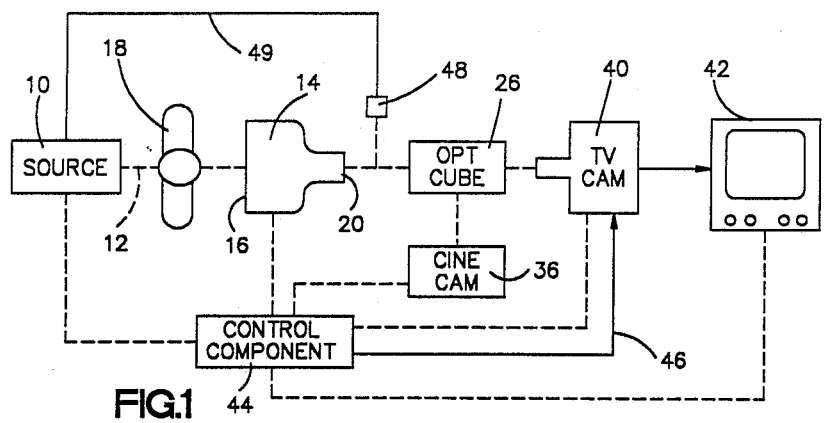
FIG. 1 is a block diagram of an imaging system incorporating the present invention.

FIG. 1 illustrates in block form a multi-mode x-ray imaging system incorporating the present invention. The system of FIG. 1 includes a source 10 for producing x-rays which are propagated along a path 12 toward an input face 14 of an image intensifier tube 16.

The image intensifier tube 16 is sufficiently spaced from the source 10 and aligned in the beam path to accommodate the location between the source and the image intensifier tube of a patient or subject 18. X-rays from the source pass through the patient and the emergent pattern of x-rays is incident upon the input face 14 of the image tube 16. The image tube 16, of known type, produces at an output face 20 a visible light image corresponding to the pattern of x-rays incident upon the input face 14.

Downstream from the intensifier tube output face 20 is a lensing system, sometimes called an "optical cube" 26, provided to receive the light output from the light image appearing at the output face of the image intensifier tube.

A television camera scanning head 40 is aligned to receive the light image via the optical cube. The television camera 40 includes a television pickup tube having a target supported by a ring about its periphery, and an electron gun. The camera 40 also includes circuitry and apparatus for causing the beam of electrons from the electron gun to scan the target at any of a predetermined number of scan rates, formats, and field scanning modes, such as interlaced and sequential. The scanning takes place in known fashion in accordance with a series of raster lines.

The television camera also includes adjustable gamma, iris and other settings, which afford the capability of operation in different scan formats, including different aspect ratios.

The television camera 40 is a television camera head and includes preamplifiers and sweep generator, yoke, camera tube, lens and an iris in front of the lens. The camera head is embodied by a catalog No. 433A-G, *Model BETA X*, available from Picker International, Inc., of Cleveland, Ohio, U.S.A.

The television camera 40 and associated system performs in one mode as a fluoro device. In the fluoro mode the television camera receives light output from the output face 20 of the image intensifier tube 16 and produces a video signal representing the brightness distribution of the viewed image, along with appropriate horizontal and vertical synchronization signals. The video and synchronization signals are transmitted to a monitor 42 and cause the monitor to produce on its face a visible continuous real time image of the image appearing at the output face of the image intensifier tube 16.

Details of an x-ray diagnostic imaging system employing television imaging apparatus and circuitry for multi-mode operation are set forth in U.S. Pat. No. 4,677,477, issued on June 30, 1987, to Plut et al, which patent is hereby expressly incorporated by reference.

The optical cube 26 includes means for splitting light energy from the output face 20 among a selected one or more optical ports. The optical cube thus divides or distributes, as desired, the light energy from the output face 20 to various other image acquisition components.

For example, a cine camera 36 is aligned with an optical path 28 from the optical cube and is capable of making a sequence of images in rapid succession of the continuous image at the output face 20 when desired.

The cine camera 36 includes known apparatus for making such sequential images at rates of, for example, 30 frames per second and 60 frames per second, as desired.

A control component 44 includes apparatus and circuitry for operating the system of FIG. 1 in accordance with any of a preselected plurality of operating modes. In this way, the control component sets up the system for performing any of a variety of different types of studies within the capability of the components of the system.

In order to accomplish this, the control component is coupled to control operation of the x-ray source 10, the cine camera 36, the television camera 40 and the monitor 42. By selection via the control component 44, an operator can preselect a given study to be executed by the system. The control component adjusts, for example, the x-ray output of the source 10, the operation of the cine camera 36, and the scanning mode and other operation of the television camera 40 to optimize system operation for the selected study.

The control component 44 also produces an external control signal appearing at a lead 46 which is directed to the television camera lead 40. The external control signal is a command signal coupled to amplification circuitry associated with the television camera to apply a fixed gain to the video signal produced by the camera which remains constant during the execution of the particular selected study. The gain commanded by the external control signal is a function of the particular study selected, and is designed to optimize the video output level to the monitor to effect optimal monitor imaging operation, notwithstanding changes from one study to the next in the x-ray output level from the source 10, and consequent changes in the brightness of the image appearing at the output face 20 as this brightness from study to study.

The x-ray imaging system of FIG. 1 is also equipped with brightness stabilization, the main component of which is a photomultiplier tube 48.

The photomultiplier tube 48 is positioned to view the output face 20 of the image intensifier tube 16. The photomultiplier tube 48 produces an electrical signal which is a function of the overall brightness of the viewed output face image. The output signal from the photomultiplier tube 48 is directed over a lead 49 to apply a feedback control signal in known fashion to the x-ray source 10. The feedback control signal operates to increase x-ray output from the source in response to a decrease in output face image brightness, and to decrease source x-ray output in response to an increase in output face image brightness. Additionally, known control circuitry is associated with the source 10 to prevent the brightness stabilization feedback circuitry from causing the source to operate at an excessively high level. The brightness control circuitry operates substantially independently of the television camera video gain adjustment circuitry described herein.

Brightness stabilization is a well known feature widely incorporated into x-ray imaging system for medical diagnostic purposes, and does not form a part of the present invention.

Brightness stabilization suffers from the limitation that one cannot simply raise the level of x-ray output in all cases to achieve a desired image brightness.

The x-ray imaging system described herein is also equipped with automatic gain control circuitry applied to the video signal produced by the television camera head. Embodiments of such automatic gain control circuitry are set forth in FIGS. 2 and 3 and are discussed in more detail below.

Figure 2:
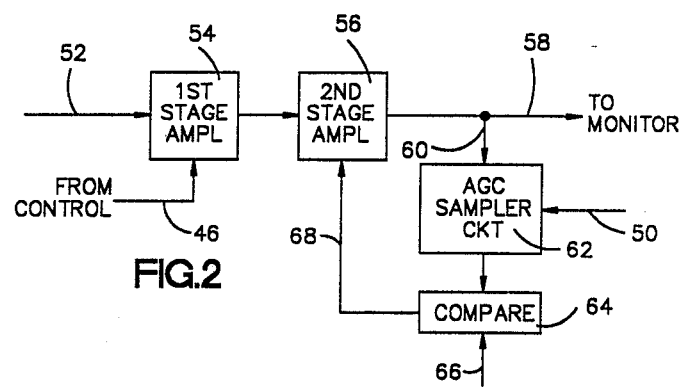
FIG. 2 is a block diagram of a portion of FIG. 1 illustrating one embodiment of the present invention.

FIG. 2 illustrates an embodiment of video amplification circuitry suitable for implementation of the present invention. In FIG. 2, the video signal produced by the television camera head 40 appears at a lead 52. The video signal is directed in series through a first amplifier stage 54 and a second amplifier stage 56, to emerge as a video output signal at a lead 58. Video output signal appearing at the lead 58 is subsequently transmitted as an input to the television monitor 42. The two-stage amplification circuitry illustrated in FIG. 2 is controlled by both the external control signal and by a sample window and other signals described in more detail below.

The external control signal, appearing at a lead 46, is directed to the first stage amplifier 54. The value of the external control signal is determined by the control component 44, whose operation is in turn controlled as a function of the particular protocol or operating mode selected by input to the control component 44. Preferably, the gain of the first stage amplifier 54 ranges between about 1.0 and 5.0, depending on the study selected. Such selection involves coordinated selection of x-ray source output, as well as television camera operating parameters.

As can be seen from the foregoing description, the first stage video amplifier 54 provides fixed gain, which is changed only from study to study. Automatic gain control circuitry, however, is used to adjust the gain of the second stage amplifier 56. Preferably, the second stage amplifier 56 has a gain ranging from 1.0 to about 2.0.

The automatic gain control circuitry includes an AGC sampler circuit 62, a comparator 64, arranged in a closed loop feedback configuration, and having sample window data and reference signal inputs at the leads 50, 66, respectively.

The AGC sampler 62 is essentially a gating and sampling circuitry whose condition is controlled by the sample window data signal appearing at the lead 50. The sampler circuit 62 gates the video output signal at the lead 58 to the comparator 64. When the signal at the lead 50 is of a first condition, the video signal is gated over a lead 60 as an input to the comparator 64. When the signal at the lead 50 is of a different condition, the sampler circuit 62 does not transmit the video output signal to the comparator 64.

The sample window data signal is derived from known circuitry within the television camera and indicates by its condition whether the video output signal at the lead 58 corresponds to a location within the sample window, or whether the video signal corresponds to a location outside the sample window. Preferably the sample window is a circular window positioned generally centrally in the image at the output face 20 of the image intensifier tube.

The sample window data signal is derived from circuitry associated with the synchronization circuitry of the television camera. When the synchronization circuitry directs the pickup tube electron beam to read a portion of the target corresponding to a location within the sample window, the signal at the lead 50 causes the output video signal at the lead 58 be transmitted to the comparator 64. When the area being read is outside the sample window, the output video is blocked from the comparator.

The other input to the comparator is a reference signal 66. The reference signal 66 represents the desired output video signal level to optimize monitor operation.

The comparator produces an amplifier gain adjust signal at a lead 68 which is a function of the difference between the sampled output video appearing at a lead 63 and the reference signal appearing at the lead 66. When the sampled output video is less than the value of the reference signal, the signal at the gain adjust lead 68 causes the second stage amplifier 56 to increase its gain. When the output video signal is greater than the reference signal, the signal at the lead 58, as produced by the comparator, causes the amplifier stage 56 to reduce its gain.

Preferably, the AGC sampler circuit 62 operates in a peak detecting mode, and the signal transmitted to the comparator 64 corresponds to the peak output video value developed within the sample window of interest. Alternately, the AGC sampler circuit 62 could be of the averaging type, which transmits to the comparator a signal corresponding to the average value of the output video over the entire sample window.

Note that when the sample window data gating signal conditions the sampler circuit 62 to block from the comparator transmission of the peak video output signal, the comparator, in the absence of other provisions, would immediately operate to increase the gain of stage two amplifier 56 to its maximum. This would not be desirable, since the times at which the sampler circuit 62 blocks out the output video from the comparator simply correspond to times in which the video signal does not correspond to the sample window.

Therefore, the AGC sampler circuit 62 is provided with time constant establishing circuitry such that the last previously delivered peak output video signal continues to be delivered to the comparator during the time that the sample window data signal turns off the sampler circuit 62.

An important feature of the present invention is that the second stage amplifier 56 is of a type which has a minimum gain. No matter what the signal at the lead 68, the gain of the amplifier 56 cannot be driven below its minimum level. Preferably, that minimum level is unity. Further the system is operated at minimum gain except for cases where the brightness stabilization circuitry cannot produce the desired brightness.

In effect, then, the automatic gain control circuitry of the FIG. 2 embodiment is it is unique in that it is "constrained". When the brightness of the image appearing at the output face 20 of the image tube 16 decreases, the AGC circuitry operates to enhance the gain on the video signal and hence compensates for the brightness decrease to maintain the video digital at an optimum operating level for the monitor 42. When, however, the sensed brightness of the sample window increases, which might occur, for example, when the sample window encompasses both a dark area of interest and a brighter area which is not of interest, the AGC circuitry is prevented from decreasing the brightness, or the amplitude, of the video signal below the predetermined minimum level. This feature has the effect of preventing or reducing the phenomenon wherein a dark area of interest is rendered even darker in the monitor image by operation of an C circuit which is responding to a bright, but uninteresting, tissue area, to render sometimes unusable, the image of the tissue of interest.

The first amplifier stage is required so that different operating modes, with different x-ray intensity levels, may be accommodated. For example, the x-ray output from the source will be at a different level for fluoroscopy, for 30 frames per second cineangiography, and for 60 frames per second cineangiography. This difference in x-ray dose makes necessary differences in the minimum video signal amplification to obtain the proper optimal video output for the monitor. Accordingly, the constant amplification of the first stage must be adjusted between studies in accordance with each different mode.

For the benefit those who are not intimately conversant with the present art, FIG. 4 illustrates in detailed schematic form the circuitry shown in block form in FIG. 2.

Figure 3:
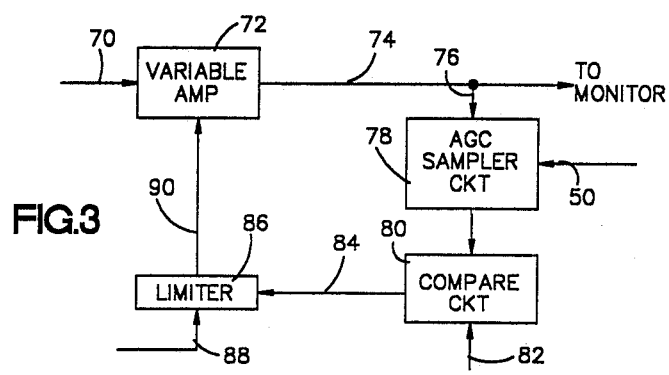
FIG. 3 is block diagram of a detail of FIG. 1 illustrating another embodiment of the present invention.

FIG. 3 illustrates in block form another embodiment of the amplification control components of the present invention.

In the embodiment of FIG. 3, the video signal of the television camera appears at a lead 70, and is directed as an input to a variable amplifier 72. The output of the variable amplifier 72 appears at a lead 74 as a video output, and is directed as the input to the monitor 42. The amplified video output is also directed over a lead 76 to an AGC sampler circuit 78. A sample window input to the sampler circuit 78 appears at the lead 50.

The AGC sampler circuit 78 operates similarly to the sampler circuit 62 illustrated in FIG. 2. The sample window data signal appearing at the lead 50 is derived in the same way as the analogous signal is derived in the FIG. 2 embodiment.

The output of the AGC sampler circuit 78 is directed as an input to a comparator 80. Input to the comparator 80 is a reference signal appearing at a lead 82 which is produced by the control component 44. The comparator 80 produces an output at a lead 84 which is a function of the difference between the input from the AGC sampler circuit 78 and the reference signal 82.

The comparator 80 and reference signal at the lead 82 operate analogously to the comparator 64 and reference signal 66 in the FIG. 2 embodiment.

The comparator output 84 is directed as an input to a limiter circuit 86. Another input to the limiter circuit 86 is an external control signal appearing at a lead 88. The external control signal is a predetermined voltage preset for each of the operating modes. The limiter circuit 86 produces an output at a lead 90 which is a function of both the external control signal and the output of the comparator 80. The limiter output appears at a lead 90 and is directed as a feedback input to the variable amplifier 72.

The limiter circuit 86 produces at its output 90 a signal which corresponds to the external control signal of the lead 88 where the external control signal is greater than or equal to the signal from the comparator which appears at the lead 84. In instances at which the signal from the comparator at the lead 84 exceeds the external control signal at the lead 88, the limiter output 90 corresponds to the comparator output signal at the lead 84.

The magnitude of the signal at the lead 90 adjusts the gain of the variable amplifier 72. The gain of the amplifier 72 is thus a function of both the comparator output 84 and the external control signal at the lead 88.

The value of the external control signal 88, as applied to the limiter circuit 86, establishes a minimum gain of the variable amplifier 72. Irrespective of the operation of the AGC circuitry, the output of the comparator 84 cannot drive the gain of the amplifier 72 to a level below that which is dictated by the value of the external control signal 88.

Preferably, the gain of the variable amplifier 72 is controlled within a range from 1.0 to about 10.0.

FIG. 5 illustrates in schematic form the details of the circuitry shown in block form in FIG. 3, for the benefit of those not intimately conversant with the present art.

The minimum gain of the amplifier 72, being a function of the external control signal 88, is in turn determined by the particular operating mode selected by the control component 44. As in the case of the FIG. 2 embodiment, selection of the minimum gain for each operating mode is within the skill in the art, and involves coordination in the selection of the x-ray output of the source 10 and the operating parameters of the television camera 40, as well as the operation of the amplifier 72.

The present invention is suitable for embodiment in an x-ray vascular imaging system known as the DIGICON 260, commercially available from Picker International, Inc., Cleveland, Ohio, U.S.A. In such a system, a typical minimum amplification gain for fluoroscopy is 4.0; for 30 frames per second cineangiography, 2.0, and for 60 frames per second cineangiography, 2.0.

The value of the external control can be manually adjusted by an operator in accordance with which operating mode is selected.

The invention, however, is not limited to manual adjustment of the external control signal. Various forms of automatic adjustment can also be employed.

For example, circuitry can be provided by those of ordinary skill in the art to respond to the selection of a particular operating mode to preset the external control to the level of first stage amplifier gain considered optimal for that mode. Such circuitry can be found for example in the above reference Patent to Plut et al.

A more general and flexible means of implementing control of the first amplification stage is by digital control techniques. Here, the level of first amplifier gain desired for each mode is stored in a unique location in a digital memory. Thus, different memory locations are automatically addressed for different modes. This arrangement provides for automatic first amplification stage gain switching. It is also flexible because the gain can easily be changed by simply changing the values digitally stored in memory.

It is to be understood that the present disclosure is intended as illustrative, rather than exhaustive, of the invention. Those of ordinary skill in the art may be able to make certain additions or modifications to, or deletions from, the embodiments presently disclosed without departing from the spirit or the scope of the invention, as expressed in the appended claims.

We claim:

1. An x-ray imaging system comprising:
   (a) a source for propagating x-rays along a path;
   (b) an image intensifier tube having an input face and an output face, said input face being aligned in said path for receipt of a pattern of x-rays, said image intensifier tube including means for converting said pattern of x-rays to a visible light image at said output face;
   (c) a television camera positioned to view said visible light image and for producing an initial electrical video signal representing the brightness distribution of said viewed image;
   (d) a television monitor coupled to receive a final video signal for producing another visible light image corresponding to said pattern of x-rays; and
   (e) means for amplifying said initial video signals by a gain which is a function of both a first control signal and the magnitude of said final video signal, said amplification means including circuitry for maintaining said gain with respect to at least a predetermined minimum value.

2. The system of claim 1, wherein: said minimum value of amplification is unity.

3. The system of claim 1, wherein said amplification means comprises:
   (a) a first stage amplifier whose gain is controlled by said first control signal; and
   (b) a second stage amplifier having variable gain, and circuitry for controlling the gain of said variable second stage amplifier as a function of said final video signal output from said second stage amplifier.

4. The system of claim 3, wherein:
   said circuitry for controlling said gain of said second stage variable amplifier includes means for maintaining the gain of said variable gain amplifier at or above a minimum level.

5. The system of claim 4, wherein said minimum gain is unity.

6. The system of claim 3, wherein said amplification control circuitry for said variable gain amplifier comprises:
   (a) a comparator;
   (b) circuitry for presenting a reference signal as another input to said comparator, and
   (d) feedback circuitry for coupling an output of the comparator to an input of said variable gain amplifier for adjusting the gain of said variable gain amplifier.

7. The system of claim 1, wherein:
   (a) the gain of said first stage amplifier ranges between about 1.0 and 5.0, and
   (b) the gain of said variable second stage amplifier ranges between about 1.0 and 2.0.

8. The system of claim 1, wherein said amplification circuitry comprises:
   (a) a variable gain amplifier;
   (b) a comparator for receiving as an input a signal corresponding to the final video output from said variable gain amplifier;
   (c) means for presenting a reference signal as another input to said comparator;
   (d) a limited circuit coupled to receive an output from said comparator which is a function of difference between said final video signal input to said comparator and said reference signal to said comparator; and
   (e) circuit means coupling said limiter circuit to said variable gain amplifier to adjust the gain of said variable gain amplifier.

9. The system of claim 8, wherein said amplification circuitry has a gain adjustable between about 1.0 and 10.0.

10. The system of claim 8, further comprising:
    (a) a gating circuit interposed between said video output from said variable gain amplifier and said comparator;
    (b) circuitry for controlling said gating circuit to pass to said comparator video output signal substantially only when said video output signal corresponds to a predetermined sample window of said visible light image at said intensifier tube output face.

11. An x-ray imaging system comprising:
    (a) a source for propagating x-rays along a path;
    (b) means aligned in said path for converting x-rays to a first visible light image corresponding to a received pattern of x-rays;
    (c) a television camera positioned for viewing said first visible light image and for producing an initial electrical video signal representing the brightness distribution of said first visible light image.
    (d) a television camera monitor coupled to said television camera and responsive to a final video signal to produce a second visible light image corresponding to said pattern of x-rays;
    (e) circuitry for amplifying said initial video signal to produce said final video signal, said amplification circuitry comprising:
        (i) a first amplifier stage for amplifying said initial video signal by a constant gain;
        (ii) a second amplifier stage in series with said first amplifier stage for further amplifying said initial video signal by a variable gain, said variable gain being a function of a comparison between said final video signal output from said variable amplifier and a reference signal, and circuitry for constraining the gain of said second stage amplifier to at least a minimum gain.

12. The system of claim 11, wherein said minimum gain is approximately unity.

13. The system of claim 11, wherein:
    said first stage amplifier includes gain adjustment circuitry for coupling to an external control for adjusting said constant gain of said first amplifier stage.

14. The system of claim 11, further comprising:
    (a) control means coupled to said source and to said television camera for operating said system in accordance with a selected one of a plurality of protocols;
    (b) means for applying said control signal to first amplification stage as a function of which of said protocols is selected.

15. The system of claim 14, wherein:
    said means for applying said external control signal comprises digital storage means for storing representations of different external control signals at different addresses.

16. The system of claim 11, wherein:
(a) the gain of said first stage amplifier ranges from about 1.0 and 2.0.

17. An x-ray imaging method comprising the steps of:
(a) propagating x-rays along a path;
(b) converting patterns of x-rays propagated along said path to a first visible image corresponding to said pattern;
(c) viewing said first visible image with a television camera to produce an initial video signal representing the brightness distribution of said first visible image;
(d) amplifying said initial video signal to produce a final video signal, said amplification having a gain which is a function of both a first control signal and of the magnitude of said final video signal, but constraining said gain to at least a predetermined minimum value.

18. An x-ray imaging system comprising:
(a) a source for propagating x-rays along a path;
(b) an image intensifier tube having an input face and an output face, said input face being aligned in said path for receipt of a pattern of x-rays, said image intensifier tube including means for converting said pattern of x-rays to a visible light image at said output face;
(c) a television camera positioned to view said visible light image and for producing an initial video signal representing the brightness distribution of said viewed image;
(d) a television monitor coupled to receive a final video signal for producing another visible light image corresponding to said pattern of x-rays;
(e) means for amplifying said initial video signal by a gain which is a function of both a first controlled signal and of the magnitude of said final video signal, said amplification means including circuitry for constraining said gain with respect to a predetermined minimum value, said amplification means comprising:
  (i) a variable gain amplifier;
  (ii) a comparator for receiving as an input, a signal corresponding to said final video signal from said variable gain amplifier;
  (iii) means for presenting a reference signal as another input to said comparator, and
  (iv) a limiter circuit coupled to receive an output from said comparator which is a function of difference between said final video signal and said reference signal which is input to said comparator, and
  circuit means coupling said limiter circuit to said variable gain amplifier to adjust the gain of said variable gain amplifier;
(f) a gating circuit interposed between said final video signal from said variable gain amplifier and said comparator;
(g) circuitry for controlling said gating circuit to pass to said comparator final video signal information substantially only when said final video signal corresponds to a predetermined sample window of said visible light image at said intensifier tube output face.

* * * * *